US012362453B2

(12) United States Patent
Stenger et al.

(10) Patent No.: US 12,362,453 B2
(45) Date of Patent: Jul. 15, 2025

(54) SOLAR MITIGATION SOLUTIONS FOR ELECTRONIC EQUIPMENT

(71) Applicant: Molex, LLC, Lisle, IL (US)

(72) Inventors: Joseph D. Stenger, Naperville, IL (US); Amrit Panda, Naperville, IL (US)

(73) Assignee: Molex, LLC, Lisle, IL (US)

( * ) Notice: Subject to any disclaimer, the term of this patent is extended or adjusted under 35 U.S.C. 154(b) by 451 days.

(21) Appl. No.: 17/866,580

(22) Filed: Jul. 18, 2022

(65) Prior Publication Data

US 2024/0405402 A1 Dec. 5, 2024

Related U.S. Application Data

(60) Provisional application No. 63/224,018, filed on Jul. 21, 2021.

(51) Int. Cl.
*H01Q 1/02* (2006.01)
*H01Q 1/32* (2006.01)

(52) U.S. Cl.
CPC ............. *H01Q 1/02* (2013.01); *H01Q 1/3275* (2013.01)

(58) Field of Classification Search
CPC .. H01Q 1/02; H01Q 1/32; H01Q 1/12; H01Q 5/22; H01Q 15/00; H01Q 15/14; H01Q 1/00
See application file for complete search history.

(56) References Cited

U.S. PATENT DOCUMENTS 7,906,202 B2 * 3/2011 Padiyath ................ G02B 5/208 428/411.1
2012/0098717 A1 * 4/2012 Petrucci ............... H01Q 1/3275 343/713
2016/0129945 A1 5/2016 Deppe
2017/0355474 A1 * 12/2017 Busche .................... B64G 1/40
2017/0361594 A1 * 12/2017 Karagiannis ............ B32B 25/08
2019/0217901 A1 * 7/2019 Borrelli ............... B60R 13/0815
2019/0304727 A1 * 10/2019 Minowa ............... H01H 50/546
2020/0350943 A1 * 11/2020 Zhan ......................... H04B 1/38
2021/0075105 A1 * 3/2021 Kashino ................. H01Q 19/06
2022/0231247 A1 * 7/2022 So .......................... H10K 30/57
2023/0057101 A1 * 2/2023 Condo ..................... G02B 1/14
2023/0288699 A1 * 9/2023 Spangler ........... B32B 17/10036

FOREIGN PATENT DOCUMENTS

WO 03036758 A1 5/2003
WO 2020165222 A1 8/2020
WO 2020203742 A1 10/2020
WO 2021095355 A1 5/2021

OTHER PUBLICATIONS

Extended European Search Report and Opinion received for EP Application No. 22186266.7, mailed on Dec. 1, 2022, 13 pages.

* cited by examiner

*Primary Examiner* — Thien M Le

(57) ABSTRACT

Exemplary embodiments are disclosed of solar mitigation solutions for electronic equipment, such as electronic control modules (ECMs) or electronic control units (ECUs) (e.g., automotive telematics control unit (TCU), TCU antenna module, etc.), antennas, antenna arrays, vehicular antenna assemblies, radomes, cellular towers, other electronic equipment that is exposed to solar radiation and suffers from the external energy impact, etc.

23 Claims, 9 Drawing Sheets

SOLAR MITIGATION SOLUTIONS FOR ELECTRONIC EQUIPMENT

CROSS-REFERENCE TO RELATED APPLICATION

This application claims the benefit of and priority to U.S. Provisional Patent Application Ser. No. 63/224,018 filed Jul. 21, 2021. The entire disclosure of this provisional patent application is incorporated herein by reference.

TECHNICAL FIELD

This disclosure generally relates to solar mitigation solutions for electronic equipment, such as electronic control modules (ECMs) or electronic control units (ECUs) (e.g., automotive telematics control units (TCUs), TCU antenna modules, etc.), antennas, antenna arrays, vehicular antenna assemblies, radomes, cellular towers, other electronic equipment that may be exposed to solar radiation and suffer from the external energy impact, etc.

DESCRIPTION OF RELATED ART

An automotive electronic control module (ECM) is an embedded system in automotive electronics configured for controlling one or more of the vehicle's electrical systems or subsystems. An example type of ECM is a telematics control unit (TCU), which may be used for an embedded system onboard a vehicle to wirelessly connect the vehicle to cloud services, connect the vehicle to other vehicles via V2X (vehicle-to-everything) standards over a network, etc.

TCUs have been commonly placed inside the cabin space of a vehicle. For example, this location may be convenient for access to systems that can benefit from access to a data connection to exterior systems but is inconvenient from a standpoint of actually connecting to the exterior. This is because the exterior of a vehicle substantially attenuates signals received and transmitted from the TCU.

To overcome this issue, conventional systems have used exterior antennas (such as a roof mounted "shark fin" antenna common on many vehicles) to provide a better antenna system. Advantageously, locating the antenna on the roof (or higher point) of the vehicle enables the clearest lines of sight to the broadcasting antennas.

SUMMARY

This section provides a general summary of the disclosure, and is not a comprehensive disclosure of its full scope or all of its features.

Exemplary embodiments are disclosed of solar mitigation solutions for electronic equipment, such as electronic control modules (ECMs) or electronic control units (ECUs) (e.g., automotive telematics control units (TCUs), TCU antenna modules, etc.), antennas, antenna arrays, vehicular antenna assemblies, radomes, cellular towers, other electronic equipment that may be exposed to solar radiation and suffer from the external energy impact, etc.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements.

DETAILED DESCRIPTION OF THE PREFERRED EMBODIMENTS

Figure 1:
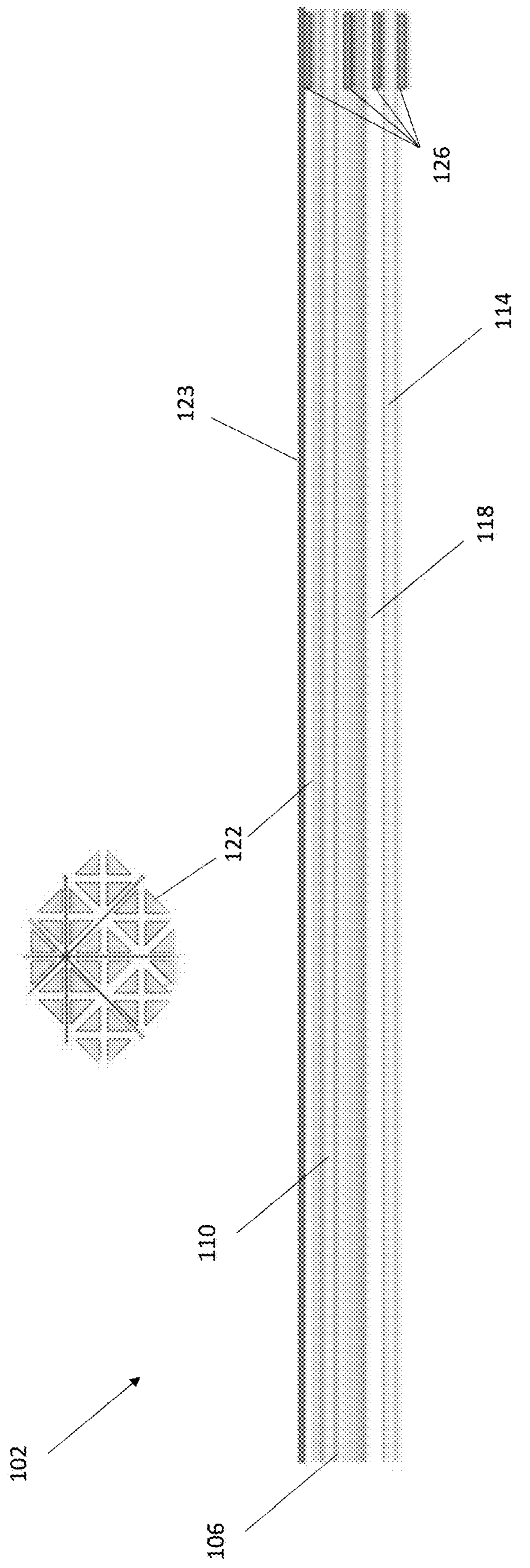
FIG. 1 illustrates a multi-layered RF (radio frequency) transparent, IR (infrared) reflective body according to an exemplary embodiment of the present disclosure.

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

An antenna may be located on a roof (or higher point) of a vehicle to enable the clearest lines of sight to the broadcasting antennas. More recently, TCUs and antennas may be internally co-located within or under the roofs of vehicles. Co-locating TCU electronics with the antenna allows for the elimination of many cables that would otherwise be required to connect the various wireless connectivity standards antennas to the electronics serving those standards, e.g., cellular+MIMO, WiFi, Bluetooth, DSRC, GPS/GNSS, etc. Removing these cables saves weight, costs, and improves performance as the signal losses of the cables can be removed.

But as recognized herein, a problem with co-locating the electronics to the roof with the antenna is that the electronics are being placed within the headliner space, which is the gap under the roof surface and cloth/interior materials used for sound deadening, aesthetics, and insulation. The headliner space essentially becomes a green house where solar heat is trapped in this space that may elevate the operating temperature to extreme values. Automobile manufacturers have moved to integrate the antenna within the vehicle body for styling reasons, reduced wind resistance, etc. In order to integrate the antenna into the body, the vehicle material must be changed from a metal to a non-metallic material (e.g., glass, polymers, etc.) that allows passage of RF signals. But as recognized herein, glass and polymers elevate the amount of solar energy that is absorbed and trapped within the headliner space. Therefore, exemplary embodiments of solar mitigation solutions were developed and/or are disclosed herein that help to minimize or at least reduce the amount of solar energy absorbed over time and thus reduce the operating temperatures of the TCU or other modules being placed within the headliner space. As disclosed herein, exemplary solar mitigation solutions are configured to reflect/block solar energy and the associated IR energy while allowing RF signals to easily pass through (e.g., a solar umbrella protecting the space, etc.).

Electronic modules may require RF signals to be received and/or transmitted in a completely or partially enclosed space or enclosure. But the enclosure in which the electronic module is positioned may be exposed to solar or high heat flux with or without active cooling. In which case, the module may experience or be subject to increased thermal loads due to (1) direct or indirect solar incidence, (2) thermal radiation associated with a greenhouse effect of the enclosure, and (3) power dissipation associated with the electronics of the module. The first two factors may be the dominant modes leading to the increase of the thermal load. The increased thermal load increases the temperature of operation, which may exceed the upper limit of the module's electronic circuits and cause a failure or loss of functionality or reduced performance of the module (e.g., throttle performance to avoid thermal overload, etc.) or reduced lifetime of electrical components caused by thermal stress.

For a thermally insulated volume within an enclosure, there may be little to no available heatsink or convective cooling, and heat cannot escape from the enclosure. In this scenario, the greenhouse effect may be the dominant factor on the thermal environment. As recognized herein, a solar mitigation solution for a thermally insulated volume may include having the area of incident solar and thermal flux be optimally covered (area dependency).

For a partially thermally insulated volume within an enclosure, there may be some heatsink capacity available such that heat may be allowed to escape the enclosure. In which case, there may be a partial greenhouse effect on the thermal environment and heat transfer pathways available. As recognized herein, a solar mitigation solution for a partially thermally insulated volume is not necessarily strongly dependent on the area of incident solar and thermal flux as other thermal mitigation efforts may also be employed.

Disclosed herein are exemplary embodiments of solar mitigation solutions for electronic equipment, such as electronic control modules (ECMs) or electronic control units (ECUs) (e.g., automotive telematics control units (TCUs), TCU antenna modules, etc.), antennas, antenna arrays, vehicular antenna assemblies, radomes, cellular towers, other electronic equipment that may be exposed to solar radiation and suffer from the external energy impact, etc.

In exemplary embodiments, a solar mitigation solution includes a single or multi-layered body capable of reflecting incident solar and thermal flux away from the electronics. The body may be adaptable or conformable into a shape around the electronics and spatially configured to greatly (e.g., maximally, etc.) reflect the incident solar/thermal flux. The body may be comprised of various structures, features, materials, patterns, shapes, and layers that are configured (e.g., selectively chosen, etc.) to be reflective to a broad spectrum of incident solar and infrared wavelengths. The choices of materials, layers, structures, etc. preferably allow RF transmissions through the body with negligible (e.g., minimal, etc.) attenuation of the RF signal. The body may be integrated as an integral part of the electronic module, or the body may be a separate discrete part of a solar mitigation solution that is added to the electronic module. The body may be configured to effectively reduce operating temperature of the electronic module to within its specified operating temperature range. The body may be configured to enable higher operating performance and reliability. The body may also include RF antenna elements as part of the solar mitigation solution. In an exemplary embodiment, the solar mitigation solution may be a design part that is visible from the outside/exterior.

With reference now to the figures, FIG. 1 illustrates an exemplary embodiment of a multi-layered RF (radio frequency) transparent, IR (infrared) reflective body 102 embodying one or more aspects of the present disclosure. As shown in FIG. 1, the body 102 includes multiple layers 106, 110, 114, 118, 122, 123 and optional locations 126 for integrated RF antenna elements and connectors. Although FIG. 1 shows multiple layers 106, 110, 114, 118, 122, and 123 in this example, other exemplary embodiments may include less than all of these multiple layers 106, 110, 114, 118, 122, and 123.

The multi-layered RF transparent, IR reflective body 102 may be used for providing a solar mitigation solution for electronic equipment, such as electronic control modules (ECMs) or electronic control units (ECUs) (e.g., automotive telematics control units (TCUs), TCU antenna modules, etc.), antennas, antenna arrays, vehicular antenna assemblies, radomes, cellular towers, other electronic equipment that may be exposed to solar radiation and suffer from the external energy impact, etc.

The body 102 may be configured for reflecting incident waves having wavelengths within the solar and/or IR spectrum and their associated energy flux. The body 102 may be configured for maximal reflection of the energy flux associated with waves having wavelengths within the solar and/or IR spectrum while the body 102 remains transparent in the RF range of wavelengths.

The layer 110 may comprise a single layer or multiple layers having different thicknesses and/or made of different materials to reflect specific frequency bands to optimize reflection, etc. For example, the layer 110 may include a stack comprising alternating $\lambda/4$ high refractive index layer and a $\lambda/4$ low refractive index layer. The number of layers used for the layer 110 may depend on the desired percentage of radiation refraction (e.g., 90%-95%, 99%, etc.) and/or the number of wavelengths to cover with the solar mitigation solution. But other exemplary embodiments may be configured differently without the layer 110.

With continued reference to FIG. 1, the layer 106 is a substrate or support layer. The substrate 106 may be made of a polycarbonate/acrylonitrile-butadiene-styrene (PC-ABS) or other suitable material. The substrate 106 may be configured to have mechanical attributes of formability, mechanical integrity, and thermal stability. Although FIG. 1 shows the substrate 106 having a flat sheet configuration in this example, the substrate 106 may be formable into non-flat three-dimensional configurations. The attribute of formability is an important factor that allows the substrate 106 to be shaped in a manner so as to maximally enclose the area of incident energy.

The substrate 106 may be configured to have a coloration, e.g., via pigmentation (e.g., white, nonmetallic, etc.) such that the substrate 106 has low IR absorbance and high IR reflectance. The substrate 106 may be configured to have smooth surface finish attributes, e.g., A-1 grade, polished white plastic, etc.

IR reflective structures and features may be incorporated into the substrate 106, such as open cell polymer structures (e.g., MuCell microcellular plastic foams, other open cell polymer foam, etc.), microspheres (e.g., hollow glass, plastic, and/or ceramic microspheres, microballoons, or bubbles, etc.), foam core polymer, etc. For example, the substrate 106 may have a broadband distribution of different pore sizes that are on the same order of the wavelength of incident energies to allow for good broadband IR reflectance in those incident wavelengths (e.g., IR wavelengths, etc.).

The layer 110 may comprise a highly reflective coating along an upper surface of the substrate 106, such as one or more of a paint, a physical vapor deposition (PVD), a paint/primer/overcoat combination, etc. For example, the highly reflective coating 110 may comprise a highly reflective white paint, aerospace paint, movie theater screen paint, etc. The highly reflective coating 110 may have a high reflectivity, such as at least 0.5 up to 0.99 reflectivity (e.g., 50%, 70% 95%, or 99% reflection of solar radiance, etc.).

The layer 114 is a low thermal conductivity or thermally insulating liner with IR blocking features. For example, the layer 114 may comprise a synthetic porous ultra-light material (e.g., Aerogel material, etc.). The layer 114 may have extremely low thermal conductivity of less than about 0.06 W/m-K (e.g., within a range from about 0.024 W/m-K to about 0.06 W, etc.). The layer 114 may comprise a flexible film having a thickness within a range from about 20 microns to about 2.5 millimeters. But in other exemplary embodiments, the layer 114 may have a thickness less than 20 microns or higher than 2.5 millimeters.

The layer 118 may comprise one or more additional layers between the substrate 106 and the layer 114. The layer 118 may comprise a single layer or multiple dielectric layers of a low-emissivity material(s).

Figure 2:
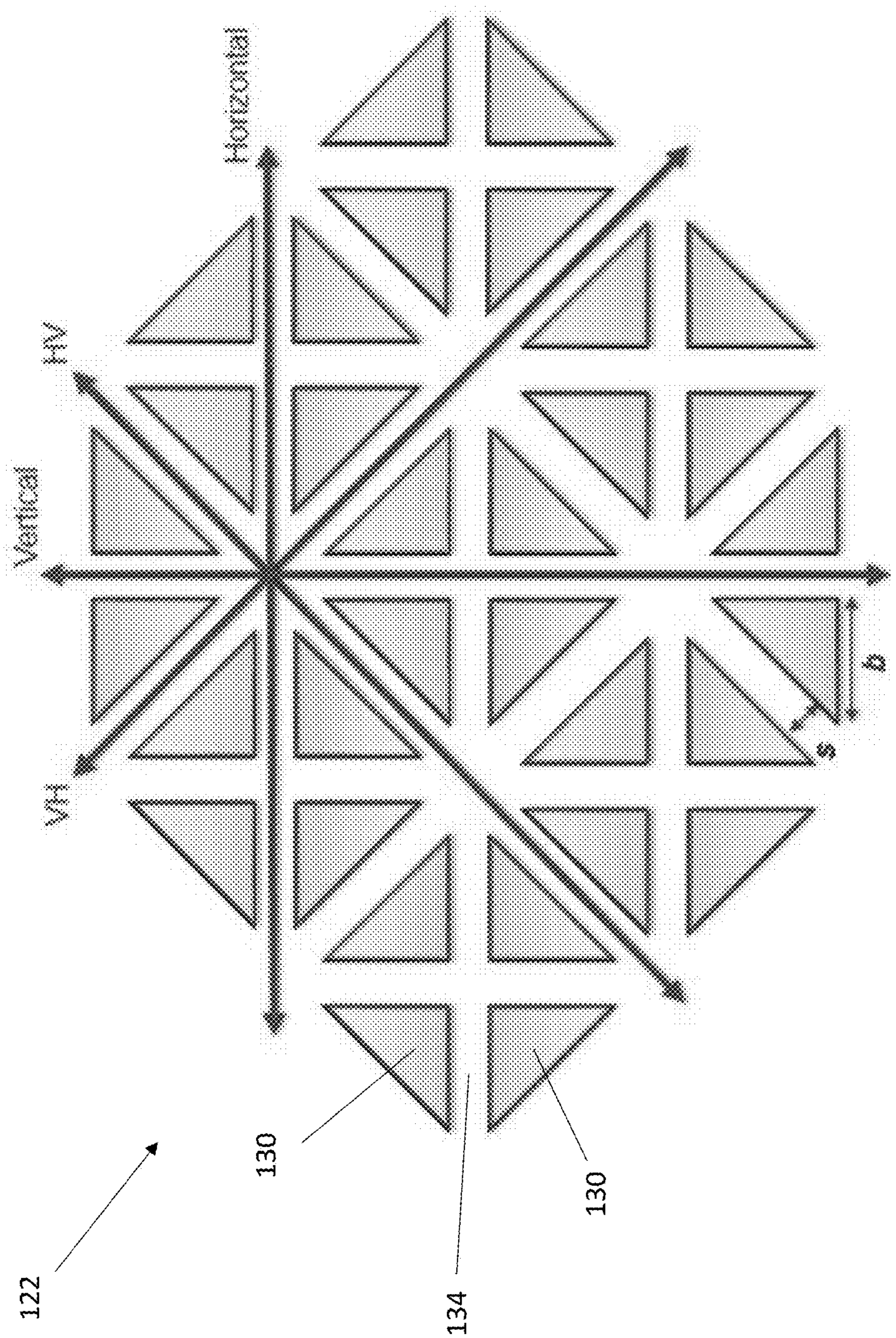
FIG. 2 illustrates a patterned RF transparent solar reflector that may be used in the multi-layered RF transparent, IR reflective body shown in FIG. 1 according to an exemplary embodiment of the present disclosure.

As shown in FIGS. 1 and 2, the layer 122 of the body 102 is a patterned RF transparent solar reflector or reflective shield. The patterned RF transparent solar reflector 122 may comprise a single-layered or multi-layered metal or dielectric film. The patterned RF transparent solar reflector 122 includes a pattern of reflectors 130 (e.g., metal mirrored solar reflectors, etc.) spaced apart from each other by areas 134 devoid of the reflectors 130. The areas 134 may comprise paint (e.g., white paint, etc.), silica, and/or other material that is more RF transparent/transmissible than the material(s) from which the reflectors 130 are made. In exemplary embodiments, one or more additional layers may be above the layer 122 and/or the layer 110 may be omitted.

The materials for the reflectors 130 may be selected from a set of metallic materials that have high reflectivity, e.g., chromium (Cr), aluminum (Al), silver (Ag), etc. The reflector material may be deposited in the form of thin films, e.g., films having a thickness within a range from about 1 nanometer to about 1000 nanometers, etc. The films may include other layers as part of a stack, such as a stack including zirconium (Zr), (Cr/Zr/Cr), titanium (Ti), and tungsten-titanium (TiW), etc. The choice of dielectrics may include silicon (Si), silicon oxide ($SiO_2$), tantalum oxide ($Ta_2O_8$), other dielectrics in similar thicknesses. The method of deposition may be physical vapor deposition (PVD), chemical vapor deposition (CVD), or other suitable means to produce the thin films described herein.

In alternative embodiments, the pattern of reflectors 130 and areas 134 may be defined by conductive and nonconductive coatings to optimize or maximize (broadly, improve) reflective surface area/performance. The conductive coatings may be patterned in such a manner as to optimize or maximize RF translucence and optimize or maximize light and IR reflectivity. By way of further example, the pattern of reflectors 130 and areas 134 may be defined by patterned double glazed glass with a low-emissivity coating.

In alternative embodiments, the layer 122 may be eliminated, or layer 122 may be configured to not have any pattern of reflectors 130. In such alternative embodiments in which the layer 122 is not patterned with reflectors 130, the layer 122 may comprise a PVD layer for additional reflectance, which PVD layer would not necessarily need to painted.

The layer 123 may comprise a protective layer over the top of the patterned reflective layer 122. For example, if the layer 122 is metal, then the layer 123 may comprise a clear coat coating or thin environmental protective layer on top of the metal layer 122 for environmental protection, e.g., inhibit oxidation of metal layer 122, etc. The layer 123 may also be configured to provide or improve overall appearance quality (e.g., A-1 grade, etc.).

FIG. 1 illustrates optional locations 126 for integrated RF antenna elements and connectors. In other exemplary embodiments, one or more RF antenna elements may also or alternatively be located on top of the multi-layered RF transparent, IR reflective body 102. For example, one or more foil antennas may be placed on top of the multi-layered RF transparent, IR reflective body 102, which foil antennas may have a protective layer, e.g., against scratches, etc.

FIG. 2 illustrates an exemplary embodiment of a patterned RF transparent solar reflector 122. In exemplary embodiments, the patterned RF transparent solar reflector 122 may be configured to provide at least 90% solar reflectance coverage. As shown in FIG. 2, the reflectors 130 comprise inverse-cross isosceles right triangles defining a pattern that provides good solar reflection and a sufficient number of unique planes of polarization. For example, the pattern of reflectors 130 shown in FIG. 2 may be configured to provide an optimal or maximized area for solar reflection while also providing an optimal or maximum number of unique planes of polarization, e.g., vertical, horizontal, vertical horizontal, horizontal vertical, etc. The shaping, spacing, and distribution of the reflectors in the pattern can be tailored and varied depending on the RF frequencies of interest. For example, instead of being for all RF frequencies, if there is only a very specific frequency—the pattern of reflectors can be optimized for just that frequency. Similarly, the distribution of the reflectors in the pattern may not need to be continuous over the entire surface, e.g., if the antennas are positioned in different locations such that the pattern may then be over certain areas and not others.

The patterned RF transparent solar reflector 122 may be used with antennas having omnidirectional radiation patterns, e.g., one or more antennas of the TCU antenna module 700 (FIG. 7), TCU antenna module 900 (FIG. 8), etc. By way of example, the pattern of reflectors may be formed by lithography, laser ablation, photo masking, etching, etc.

Figure 3:
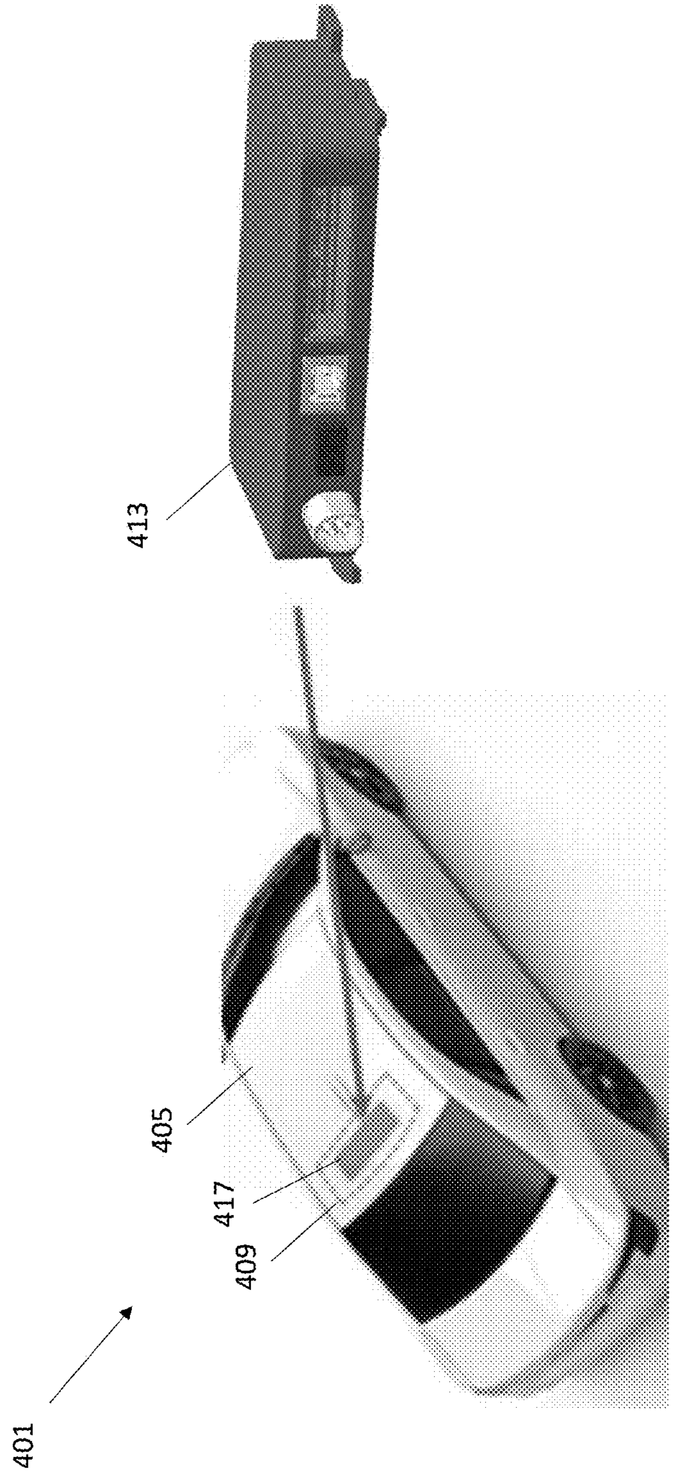
FIG. 3 illustrates a vehicle including an interior roof compartment for installation of a TCU below an RF transparent portion of the vehicle roof.

As noted above, TCUs and antennas may be internally located within or under the roofs of vehicles. For example, FIG. 3 illustrates a vehicle 401 including a roof 405 that defines an interior compartment 409 for a telematics control unit (TCU) 413. When the roof 405 is made of metal or other RF blocking material, the roof 405 would block RF signals from passing through the roof 405 into and out of the interior compartment 409. Therefore, an RF transparent portion 417 (e.g., glass, painted plastic, etc.) is provided over the TCU 413 to thereby allow RF signals to pass through the RF transparent portion 417 into and out of the interior compartment in which the TCU 413 is positioned. But as explained herein, solar loading on the RF transparent portion 417 may be significant, e.g., 4× to 20× greater than the electronic power dissipation.

Thermal requirement for TCU antenna modules has increased because of the power dissipation of their increasingly complex and more powerful cellular transceiver and App processing circuits as well as the addition of new technologies (e.g., V2X and/or DSDA (multiple cellular modems), etc.). In addition, the thermal requirement for TCU antenna modules has also increased because of elevated base line environmental condition of ambient temperature of 85° C. due to the location of the TCU antenna modules within vehicle roofs and the limited space and airflow in that location. Further, the thermal requirement for TCU antenna modules has increased because of the increased thermal constraint due to solar radiation heating the installation space that is covered by a glass, plexiglass, or plastic surface covering so to not impede the RF transmissions as would traditional metal body panels. Solar radiation may be absorbed by components within the vehicle roof structure resulting in elevated baseline module temperature, including the vehicle roof surface, the vehicle roof structure, and air within the roof's interior compartment in which the module is positioned and the TCU antenna module.

After recognizing the above, exemplary embodiments were developed and/or disclosed herein for mitigating the effects of the solar energy accumulating heat within a TCU antenna module (or within the space in which TCU antenna module operates). The solar mitigation may help ensure the performance and long-term reliability of the TCU antenna module.

With continued reference to FIG. 3, the magnitude of the solar loading problem may be considerable as will now be explained. The RF transparent portion 417 may have a width of 40 cm and a length of 30 cm. In this example, the solar power spectral density may be from about 200 to 1000 $W/m^2$. The solar loading may be about 24 to 120 W, which is directly proportional to the area of the space directly under the RF transparent portion 417. The electronic power dissipation may be about 6 to 11 W. Accordingly, the solar loading on the RF transparent portion 417 may be 4× to 20× greater than the electronic power dissipation. Therefore, it would be desirable to have a solar mitigation solution that reduced the solar impact by at least about 10× to 15×.

By way of background, 99% of the solar power reaching Earth's surface has a wavelength between 300 nanometers (nm) and 2.5 microns (μm). While developing the exemplary solar mitigation solutions disclosed herein, it was assumed that total energy was 200to 1000 $W/m^2$. Infrared (IR) and Near Infrared (NIR) contains 50-60% of the incident radiation energy distribution where 3% ultraviolet (UV), 29% visible, and 58% IR/IR. In exemplary embodiments, the solar mitigation solution is configured for targeting to filter/block 100 nm to 10,000 nm wavelengths and targeting to allow transmission of 3 cm to 5 m wavelength (100 MHz to 6 GHz). For example, an exemplary embodiment of a solar mitigation solution is configured for blocking UV to Near IR 100 nm to 10,000 nm wavelengths while allowing FM to GHz 3 cm to 5 m wavelengths. As another example, an exemplary embodiment of a solar mitigation solution may be configured for blocking the re-radiated spectrum in longwave IR 10,000 to 100,000 um wavelengths.

Figure 4:
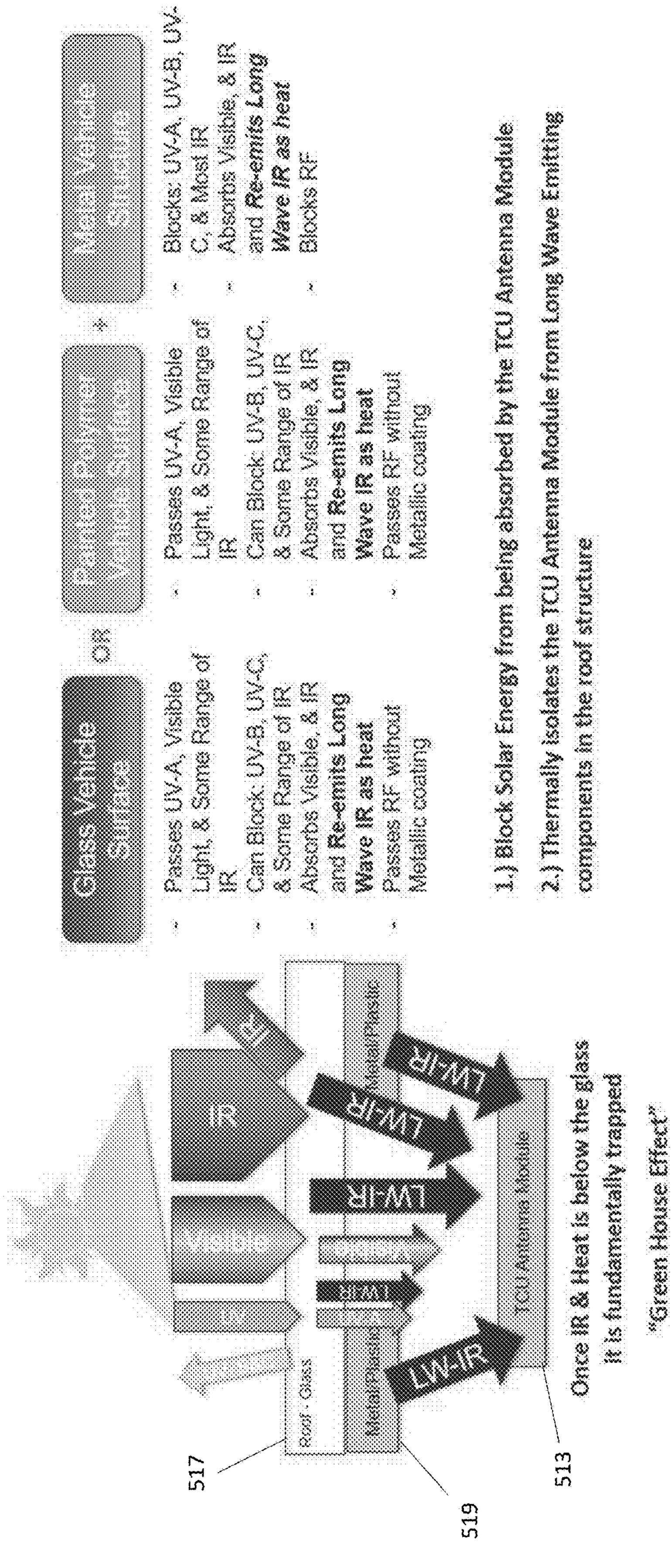
FIG. 4 illustrates a TCU antenna module subjected to solar flux and identifies various considerations for developing a solar mitigation solution for the TCU antenna module according to an exemplary embodiment of the present disclosure.

FIG. 4 illustrates a TCU antenna module 513 subjected to solar flux and identifies various considerations when developing solar mitigation solutions, e.g., configured to block solar energy from being absorbed by the TCU antenna module 513 and to thermally isolate the TCU antenna module 513 from long wave emitting components in a vehicle roof structure.

As shown in FIG. 4, the RF transparent portion 517 (e.g., glass vehicle surface, painted polymer vehicle surface, etc.) can pass UV-A, visible light, and some range of IR but will block UV-B, UV-C, and some range of IR. The RF transparent portion 517 will absorb visible light and IR and re-emit long wave IR as heat. The RF transparent portion 517 without a metallic coating will pass RF.

The metal vehicle structure 519 will block UV-A, UV-B, UV-C, and most IR. The metal vehicle structure 519 will absorb visible light and IR and re-emit long wave IR as heat. The metal vehicle structure 519 blocks RF.

Figure 5:
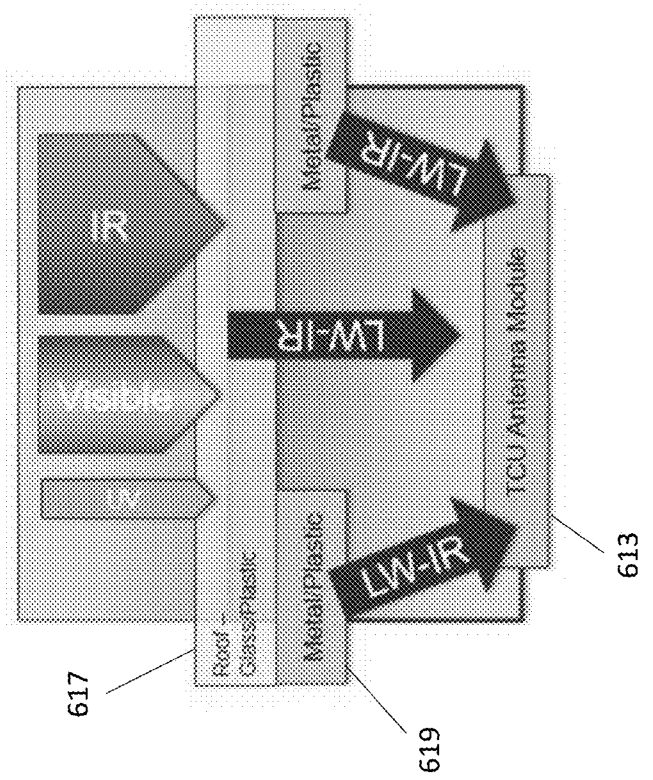
FIG. 5 illustrates the solar energy absorbed by components of the vehicle being re-radiated as long wave IR.

FIG. 5 illustrates solar energy absorbed by components of the vehicle being re-radiated as long wave IR. The long wave IR may heat and increase temperature of the TCU antenna module 613. As shown in FIG. 5, the RF transparent portion 617 (e.g., glass vehicle surface, painted polymer vehicle surface, etc.) may absorb visible light and IR and re-radiate the absorbed solar energy as long wave IR. The vehicle structure 619 (e.g., metal, plastic, etc.) may absorb visible light and IR and re-radiate the absorbed solar energy as long wave IR.

After recognizing the above, exemplary embodiments were developed and/or are disclosed herein of solutions for blocking solar energy from being absorbed by a TCU antenna module and for thermally isolating the TCU antenna module from long wave emitting components in a vehicle roof structure. In exemplary embodiments, a solution may be primarily configured for mitigating infrared energy. For example, absorption of solar energy or energy from environment may be minimized or at least reduced by using a light-colored reflective material for a housing exterior (e.g., silver coating along exterior of housing, etc.). And, a dark-colored material (e.g., black, etc.) may be used within the housing for more effectively absorbing energy from electronics within the housing.

Exemplary embodiments are disclosed herein of solutions (e.g., multilayered solution, single or multilayered solar reflector (mirror), RF transparent reflector, etc.) that are configured to provide environment temperature reduction and RF transparency, e.g., for automotive electronic control modules (ECMs) or electronic control units (ECUs) (e.g., TCU, TCU antenna module, etc.), antennas, antenna arrays, vehicular antenna assemblies, etc.

In an exemplary embodiment, a multilayered solution includes multiple layers of dissimilar materials to address Visible, Near IR, and Long-Wave IR (radiated heat). In this example, the solution may include reflective layers, a thermally insulative housing (e.g., polymer housing including glass beads or other micro voids within the polymer to lower thermal conductivity, etc.,), and a low thermally conductive or thermally insulative layer (e.g., Aerogel synthetic porous ultra-light material, other thermally insulative layer having a low thermally conductivity, etc.).

In another exemplary embodiment, a single or multi-layered solar reflector (e.g., mirror, etc.) includes N-number of layers that may include multiple dielectrics and/or multiple coating types (e.g., a highly reflective white paint, physical vapor deposition (PVD), other coating, etc.). The multiple coating types may comprise a coating having a high reflectivity, low emissivity, low absorption, low transmission, and RF transparency. This exemplary embodiment may include customizing the number of layers and layer thicknesses to selectively target specific frequency bands to optimize reflection. Microspheres (e.g., hollow glass, plastic, and/or ceramic microspheres, microballoons, or bubbles, etc.) may be used for reducing thermal conductivity and for providing thermally insulation. The microspheres may be incorporated within coating materials. For example, microsphere having a sphere size within a range from 12 microns to about 30 microns may be embedded within a paint or other coating material having a thickness within a range from about 380 microns to about 500 microns, etc. Additionally, or alternatively, the microspheres may be used as a filler within an injection moldable material for a housing of the automotive ECM (e.g., TCU antenna module 700 (FIGS. 6 and 7), TCU antenna module 900 (FIG. 8), etc.).

In a further exemplary embodiment, an RF transparent reflector includes conductive and nonconductive coatings that are patterned to optimize or maximize reflective surface area/performance. The conductive coatings may be patterned in such a manner as to optimize or maximize RF translucence and optimize and maximize light and IR reflectivity.

Exemplary embodiments disclosed herein may be used in various applications, including automotive electronic control modules (ECMs) or electronic control units (ECUs) (e.g., TCU, TCU antenna module, etc.), antennas, antenna arrays, vehicular antenna assemblies, etc. For example, an exemplary embodiment of a solar mitigation solution disclosed herein may be applied directly to or adjacent an ECU within a vehicle cavity or space under a transparent surface (e.g., glass, etc.) or under an opaque surface (e.g., metal roof, etc.) through which significant heat energy is transmitted to the ECU. As another example, an exemplary embodiment of a solar mitigation solution disclosed herein may be applied so as to not only provide protection to the ECU but also to provide "umbrella" protection to other modules within the same or an adjacent location. As a further example, a solar mitigation solution disclosed herein may be an exterior part, e.g., roof design cover, etc.

Figure 6:
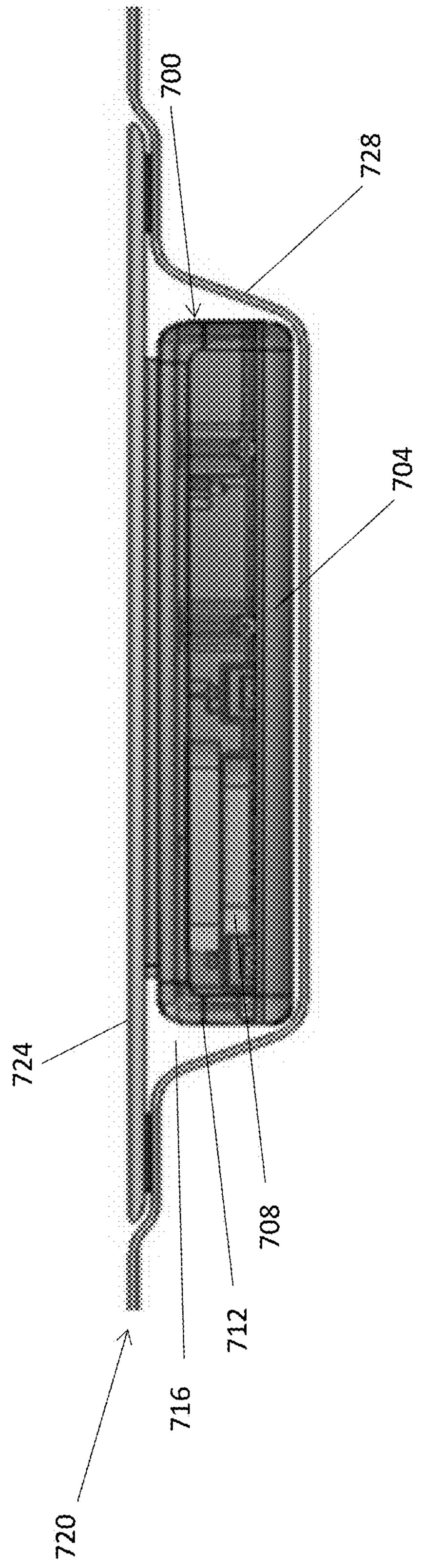
FIG. 6 illustrates an exemplary TCU antenna module including a TCU and antennas within an enclosure or housing, which is disposed within an interior compartment or cavity of a vehicle roof.

FIG. 6 illustrates an exemplary embodiment of a TCU antenna module 700 including a telematics control unit (TCU) 704 and antennas 708 within an enclosure or housing 712. The TCU antenna module 700 is disposed within an interior compartment or cavity 716 of a vehicle roof 720 generally between a RF transparent exterior roof surface portion 724 (e.g., glass, painted plastic, etc.) and vehicle roof structure 728 (e.g., headliner, etc.).

By way of example, the antennas 708 of the TCU antenna module 700 may include a Global Navigation Satellite System (GNSS) patch antenna stacked on top of a Satellite Digital Audio Radio Service (SDARS) patch antenna. The TCU antenna module 700 may also or alternatively include one or more other antennas operable with different frequencies and/or bandwidths, such as one or more antennas for V2X (vehicle-to everything), C-V2X (cellular vehicle-to-everything), remote keyless entry (RKE), Bluetooth Low Energy (BLE), Dedicated Short-Range Communication (DSRC), Wi-Fi, Cellular Communication (e.g., 3G, 4G, 5G, etc.), mmWave, GPS/GNSS or high-performance global networking satellite systems (HP-GNSSs), satellite broadband data communication, SDARS, UWB, LPWAN, Digital Radio & TV, etc.

Figure 7:
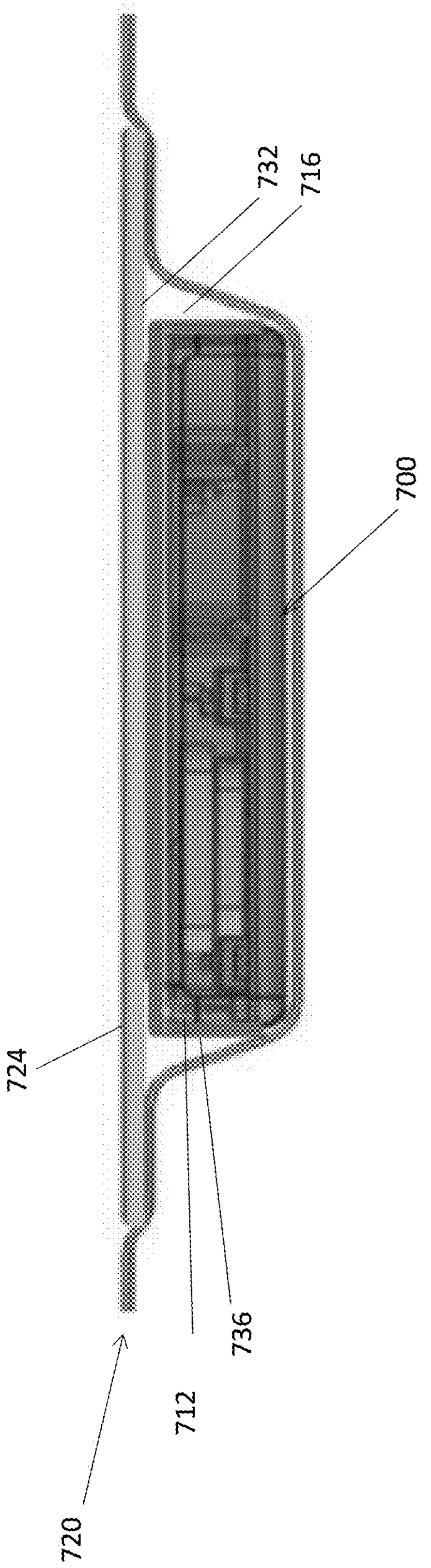
FIG. 7 illustrates the exemplary TCU antenna module shown in FIG. 6 provided with a solar mitigation solution according to an exemplary embodiment of the present disclosure.

FIG. 7 illustrates the exemplary TCU antenna module 700 provided with a solar mitigation solution according to an exemplary embodiment. In this exemplary embodiment, a solar reflective cover 732 (broadly, a solar reflector) is disposed along an upper portion of the interior compartment 716 below the RF transparent exterior roof surface 724. A protective cover 736 is disposed along an outer surface of the TCU antenna module housing 712. Although the exemplary embodiment shown in FIG. 7 includes both the solar reflective cover 732 and the protective cover 736, other exemplary embodiments may include either the solar reflective cover 732 or the protective cover 736, but not both.

The solar reflective cover 732 is configured to define an incident plane to reflect solar radiation and thereby prevent or at least inhibit the ingress of solar radiation into the interior compartment 716 in which the TCU antenna module 700 is located. By way of example, the solar reflective cover 732 may be provided (e.g., coated, painted, adhesively attached to, etc.) along a bottom surface of the RF transparent exterior roof surface 724 and/or along a top surface of the protective cover 736.

The solar reflective cover 732 may be configured to extend across a substantial entirety of the upper portion of the interior compartment 716. Alternatively, the solar reflective cover 732 may be configured to only cover the TCU antenna module 700. Stated differently, the solar reflective cover 732 may have a footprint or surface area that coincides with and is about equal in size to the footprint or surface area of the top of the TCU antenna module 700.

The protective cover 736 is disposed along the outer surfaces of the top and sidewalls of the TCU antenna module housing 712. The protective cover 736 is configured for providing protection to the TCU antenna module 700 from solar energy and from re-radiated long wave IR energy as heat from surrounding bodies.

The solar reflective cover 732 and/or protective cover 736 may comprise a coating having a high reflectivity, low emissivity, low absorption, low transmission, and RF transparency. Microspheres (e.g., hollow glass, plastic, and/or ceramic microspheres, microballoons, or bubbles, etc.) may be incorporated within the coating. For example, the solar reflective cover 732 may comprise a highly reflective (e.g., white, etc.) coating having a thickness within a range from about 380 microns to about 500 microns and that includes microspheres having a sphere size within a range from 12 microns to about 30 microns.

The solar reflective cover 732 and/or the protective cover 736 may comprise a multilayered solution, a single or multi-layered solar reflector, and/or an RF transparent reflector as disclosed herein. For example, the cover 732 and/or 736 may include multiple layers of dissimilar materials to address Visible, Near IR, and Long-Wave IR (radiated heat). As another example, the cover 732 and/or 736 may comprise a single or multi-layered solar reflector including N-number of layers that may include multiple dielectrics and/or multiple coating types (e.g., a highly reflective white paint, physical vapor deposition (PVD), etc.). The cover 732 and/or 736 may comprise the multilayered RF transparent, IR reflective body 102 as shown in FIG. 1 and described herein. The cover 732 and/or 736 may comprise an RF transparent reflector including conductive and nonconductive coatings patterned to optimize or maximize reflective surface area/performance, RF translucence, and/or light and IR reflectivity.

The TCU antenna module housing 712 may be injection molded from an injection moldable material. The injection moldable material (e.g., polycarbonate/acrylonitrile-butadiene-styrene (PC-ABS), etc.) may include microspheres, e.g., for reducing thermal conductivity, etc. Additionally, or alternatively, the TCU antenna module housing 712 may be made from a heat reflecting material, such as open cell polymer (e.g. MuCell microcellular plastic foams, other open cell foam, etc.), foam core polymer, etc. A light-colored reflective material may be used along an exterior of the housing 712 (e.g., silver coating along exterior of housing, etc.) to minimize or at least reduce absorption of solar energy or energy from environment. A dark-colored energy absorbent material (e.g., black, etc.) may be used within the housing 712 for more effectively absorbing energy from electronics within the housing 712.

Figure 8:
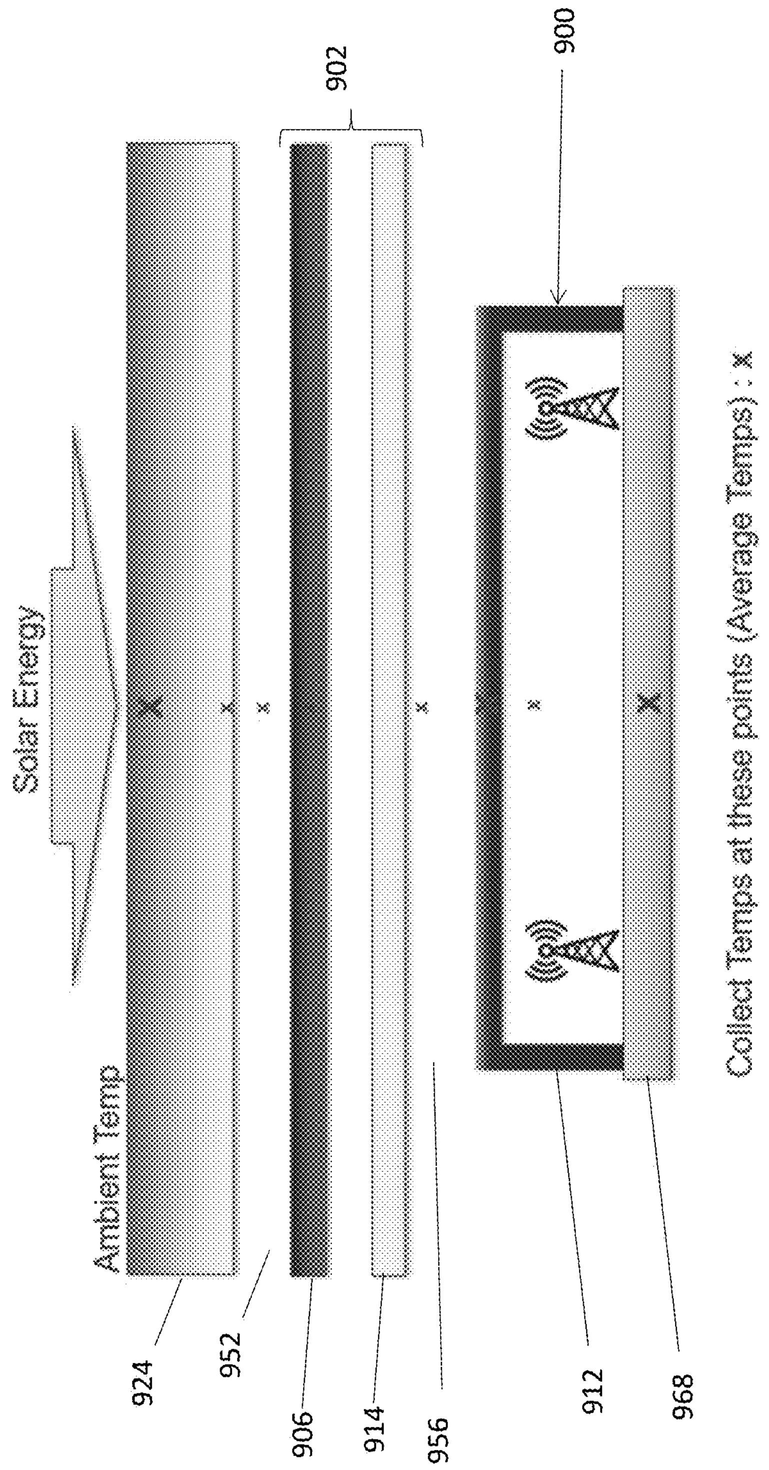
FIG. 8 illustrates an exemplary TCU antenna module provided with a solar mitigation solution according to an exemplary embodiment of the present disclosure.

FIG. 8 illustrates an exemplary TCU antenna module 900 including a solar mitigation solution according to an exemplary embodiment. The TCU antenna module 900 includes a telematics control unit (TCU) and antennas within an enclosure or housing 912, and a heatsink 968. In FIG. 8, temperature may be collected at the points X during simulation testing, e.g., at ambient temperature of 25 degrees Celsius and 40 degrees Celsius and solar energy of 1000 W/m$^2$.

A multi-layered RF (radio frequency) transparent, IR (infrared) reflective body 902 is disposed generally between the TCU antenna module 900 and an RF transparent exterior roof surface 924 (e.g., 6 mm thick glass, etc.). By way of example, the body 902 may be similar or essentially identical to the multi-layered RF transparent, IR reflective body 102 shown in FIG. 1 and described herein. Thus, the discussion of the multi-layered RF transparent, IR reflective body 902 will be abbreviated in this exemplary embodiment.

In the illustrated embodiment of FIG. 8, the multi-layered RF transparent, IR reflective body 902 includes three layers 906 and 914. The layers 906 and 914 may include features similar or essentially identical to the corresponding features of layers 106 and 914 shown in FIG. 1 and described herein. Thus, the discussion of the layers 906 and 914 will be abbreviated in this exemplary embodiment.

The layer 906 is a substrate or support layer (e.g., PC-ABS, black and white, 2 mm thick, etc.). A highly reflective coating may be along an upper surface of the substrate 906, such as one or more of a paint, a physical vapor deposition (PVD), a paint/primer/overcoat combination, etc. The highly reflective coating 110 may have a high reflectivity, such as at least 0.5 up to 0.99 reflectivity (e.g., 50%, 70% 95%, or 99% reflection of solar radiance, etc.).

The layer 914 is a low thermal conductivity (e.g., 30 mW/m-K, etc.) insulating material (e.g., Aerogel synthetic porous ultra-light material, a thickness from 0.2 mm to 2 mm, etc.) along a lower surface of the substrate 906. The multi-layered RF transparent, IR reflective body 902 may include one or more additional layers as disclosed herein.

An air gap 952 is defined generally between the multi-layered RF transparent, IR reflective body 902 and the RF transparent exterior roof surface 924. Accordingly, the multi-layered RF transparent, IR reflective body 902 is spaced apart from the RF transparent exterior roof surface 924 by the air gap 952. By way of example, the air gap 952 may have a thickness within a range from about 0 mm to about 6 mm (e.g., about 0 mm, about 0.6 mm, about 6 mm, etc.).

An air gap 956 is defined generally between the layer 914 and the enclosure or housing 912. Accordingly, the enclosure or housing 912 is spaced apart from the layer 914 by the air gap 956. By way of example, the air gap 956 may have a thickness within a range from about 0 mm to about 6 mm (e.g., about 0 mm, about 0.6 mm, about 6 mm, etc.).

Figure 9:
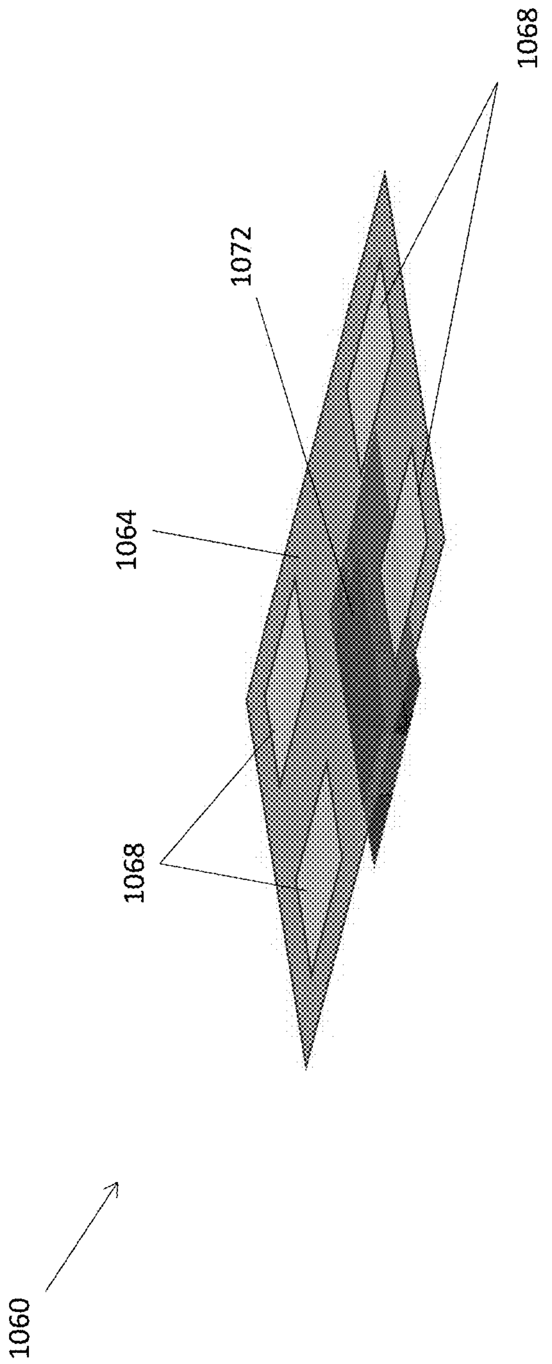
FIG. 9 illustrates an antenna assembly integrated with a solar umbrella according to an exemplary embodiment of the present disclosure.

FIG. 9 illustrates an antenna assembly 1060 including an integrated solar umbrella 1064 according to an exemplary embodiment of the present disclosure. One or more antennas 1068 (e.g., MIMO antennas, etc.) may be integrated with and supported by the solar umbrella 1064. In this exemplary embodiment, four MIMO antennas 1068 are supported by the solar umbrella 1064. In other exemplary embodiments, there may be more or less than four antennas, other antennas besides MIMO antennas, and/or antennas spaced part differently for optimized antenna performance.

The solar umbrella 1064 may be configured for reflecting incident waves having wavelengths within the solar and/or IR spectrum and their associated energy flux. The solar umbrella 1064 may be configured for maximal reflection of the energy flux associated with waves having wavelengths within the solar and/or IR spectrum while the body 102 remains transparent in the RF range of wavelengths.

By way of example, the solar umbrella 1064 may be (e.g., may include a material stack-up, etc.) similar or essentially identical to the multi-layered RF transparent, IR reflective body 102 shown in FIG. 1 and described herein. As another example, the solar umbrella 1064 may comprise thermoplastic (e.g., polycarbonate/acrylonitrile butadiene styrene (PC-ABS) thermoplastic, etc.), a rigid polymer, a semi-rigid polymer, or other electrically non-conductive material that would not block RF signals, etc.

The solar umbrella 1064 may comprise a semi-flexible solar reflective shield that is conformable to a non-flat surface, such as a vehicle roof or other mounting location, etc. For example, the solar umbrella 1064 may be sufficiently flexible to attach to a vehicle roof without any gap between the vehicle roof and the solar umbrella 1064 regardless of the vehicle roof curvature. The solar umbrella 1064 may also be rigid enough to hold itself in position and against the vehicle roof. Alternatively, the solar umbrella 1064 may be adhered to a vehicle roof with an adhesive. The solar umbrella 1064 may be configured to provide or improve overall appearance quality (e.g., A-1 grade, etc.).

Also shown in FIG. 9 is a relatively rigid counterpart 1072 supported by the solar umbrella 1064. The counterpart 1072 is sufficiently rigid for the antenna connector on the TCU main PCBA.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A solar mitigation apparatus for mitigating effects of solar energy accumulating heat within electronic equipment or within an interior compartment for the electronic equipment, the solar mitigation apparatus comprising:

a body including one or more layers positionable relative to the electronic equipment or the interior compartment and configured for reflecting or blocking solar energy and associated infrared energy while allowing radio frequency signals to pass through the body to and from the electronic equipment when the electronic equipment is located within the interior compartment;

wherein the one or more layers of the body comprise a patterned radio frequency transparent solar reflector including a pattern of reflectors spaced apart from each other by areas devoid of the reflectors.

2. The solar mitigation apparatus of claim 1, wherein the pattern of reflectors comprises a pattern of inverse-cross isosceles right triangle reflectors configured to provide an optimal area for solar reflection while also providing an optimal number of unique planes of polarization including vertical polarization, horizontal polarization, vertical horizontal polarization, and horizontal vertical polarization.

3. The solar mitigation apparatus of claim 1, wherein the patterned radio frequency transparent solar reflector comprises conductive coatings and nonconductive coatings defining the pattern of reflectors spaced apart from each other by the areas devoid of the reflectors, wherein the conductive coatings are patterned to optimize radio frequency translucence and to optimize light and infrared reflectivity.

4. The solar mitigation apparatus of claim 1, wherein the body comprises a multi-layered radio frequency transparent, infrared reflective body configured for reflecting incident waves having wavelengths within a solar spectrum or an infrared spectrum and their associated energy flux while remaining transparent for passage of radio frequency signals.

5. The solar mitigation apparatus of claim 1, wherein the one or more layers of the body comprise an alternating stack of one or more λ/4 high refractive index layers and one or more 24 low refractive index layers.

6. The solar mitigation apparatus of claim 1, wherein the one or more layers of the body comprise:

a substrate;

a reflective coating along an upper surface of the substrate;

a thermally-insulating layer; and one or more dielectric layers comprising one or more low-emissivity materials, the one or more dielectric layers disposed between a lower surface of the substrate and an upper surface of the thermally-insulating layer.

7. The solar mitigation apparatus of claim 6, wherein the one or more layers of the body comprise a patterned radio frequency transparent solar reflective layer above the reflective coating along the upper surface of the substrate, the patterned radio frequency transparent solar reflector including the pattern of reflectors spaced apart from each other by areas devoid of the reflectors.

8. The solar mitigation apparatus of claim 6, wherein the substrate is configured to at least one of:

be formable into a non-flat three-dimensional configuration, thereby allowing the substrate to be shaped so as to maximally enclose an area of incident energy;

have a broadband distribution of different pore sizes that are on a substantially same order of wavelength of incident energies to allow for good broadband infrared reflectance in the wavelength of incident energies; or have a coloration that provides the substrate with low infrared absorbance and high infrared reflectance.

9. The solar mitigation apparatus of claim 1, wherein the one or more layers of the body at least one of:

define one or more locations for one or more integrated radio frequency antenna elements or one or more locations for one or more connectors;

the one or more layers of the body are configured for blocking ultraviolet to near infrared 100 nanometer to 10,000 nanometer wavelengths while allowing transmission of 3 centimeter to 5 meter wavelength; or are configured for blocking a re-radiated spectrum in longwave infrared 10,000 to 100,000 um wavelengths.

10. The solar mitigation apparatus of claim 1, the solar mitigation apparatus operable for blocking solar energy from being absorbed by the electronic equipment and for thermally isolating the electronic equipment from long wave emitting components, thereby allowing a reduction in operating temperature of the electronic equipment.

11. The solar mitigation apparatus of claim 10, wherein:

the body of the solar mitigation apparatus is integrated with the electronic equipment and is an integral part of the electronic equipment, or the body of the solar mitigation apparatus is a discrete part from the electronic equipment that is configured to be applied directly to or adjacent to the electronic equipment within the interior compartment; or the electronic equipment comprises one or more of an electronic control module, an electronic control unit, an automotive telematics control unit, an antenna, an antenna array, a vehicular antenna assembly, a radome, or a cellular tower.

12. The solar mitigation apparatus of claim 1, further comprising a vehicle, the vehicle including a roof including a radio frequency transparent portion, an interior compartment below the radio frequency transparent portion, and a telematics control unit within the interior compartment below the radio frequency transparent portion;

wherein:

the radio frequency transparent portion is configured to allow radio frequency signals to pass therethrough into and out of the interior compartment to/from the telematics control unit; and the one or more layers of the body of the solar mitigation apparatus are disposed along an upper portion of the interior compartment between the radio frequency transparent portion and the telematics control unit, whereby the one or more layers of the body are operable for inhibiting an ingress of solar radiation into the interior compartment.

13. The solar mitigation apparatus of claim 12, wherein the telematics control unit comprises a housing, and wherein the solar mitigation solution apparatus further comprises at least one of:

a protective cover along an outer surface of the housing, the protective cover configured for providing protection to the telematics control unit from solar energy and from re-radiated long wave infrared energy as heat from one or more other heat sources;

a light-colored reflective material along an exterior of the housing to reduce absorption of solar energy or energy from environment; or a dark-colored energy absorbent material within the housing for absorbing energy from electronics within the housing of the telematics control unit.

14. The solar mitigation apparatus of claim 12, wherein:

a heat sink is below the telematics control unit;

the body of the solar mitigation apparatus is spaced apart from the radio frequency transparent portion of the roof by an air gap; or the body of the solar mitigation apparatus is spaced apart from the telematics control unit by an air gap.

15. The solar mitigation apparatus of claim 1, further including an antenna assembly comprising one or more antennas;

wherein the one or more layers of the body of the solar mitigation apparatus comprises a solar umbrella integrated with the antenna assembly and configured for supporting the one or more antennas, the solar umbrella configured for reflecting incident waves having wavelengths within a solar spectrum or an infrared spectrum and their associated energy flux while remaining transparent for passage of radio frequency signals.

16. The solar mitigation apparatus of claim 15, wherein the solar umbrella is conformable and attachable to a non-flat surface substantially without any gap therebetween.

17. A vehicle comprising:

a roof including a radio frequency transparent portion and an interior compartment below the radio frequency transparent portion;

a telematics control unit within the interior compartment below the radio frequency transparent portion; and a solar reflective cover along an upper portion of the interior compartment between the radio frequency transparent portion and the telematics control unit, the solar reflective cover is configured to define an incident plane to reflect solar radiation to thereby inhibit an ingress of solar radiation into the interior compartment.

18. The vehicle of claim 17, wherein the solar reflective cover is configured to at least one of:

extend across a substantial entirety of the upper portion of the interior compartment; or have a footprint or surface area about equal to or larger in size than a footprint or surface area of a top of the telematics control unit.

19. The vehicle of claim 17, wherein the solar reflective cover comprises at least one of:

one or more coatings having a high reflectivity, low emissivity, low absorption, low transmission, and radio frequency transparency;

multiple layers of dissimilar materials to address visible light, near infrared, and long-wave infrared or radiated heat; or a highly reflective coating having a thickness within a range from about 380 microns to about 500 microns and that includes microspheres having a sphere size within a range from 12 microns to about 30 microns.

20. The vehicle of claim 17, wherein the telematics control unit comprises a housing, and wherein:

a protective cover is along an outer surface of the housing, the protective cover configured for providing protection to the telematics control unit from solar energy and from re-radiated long wave infrared energy as heat from one or more other heat sources;

a light-colored reflective material is along an exterior of the housing to reduce absorption of solar energy or energy from environment; or a dark-colored energy absorbent material is within the housing for absorbing energy from electronics within the housing of the telematics control unit.

21. The vehicle of claim 17, wherein:

a heat sink is below the telematics control unit;

a body of the solar reflective cover is spaced apart from the radio frequency transparent portion of the roof by an air gap; or the body of the solar reflective cover is spaced apart from the telematics control unit by an air gap.

22. An antenna assembly comprising one or more antennas and a solar umbrella integrated with the antenna assembly and configured for supporting the one or more antennas, the solar umbrella configured for reflecting incident waves having wavelengths within a solar spectrum or an infrared spectrum and their associated energy flux while remaining transparent for passage of radio frequency signals.

23. The antenna assembly of claim 22, wherein the solar umbrella is conformable and attachable to a non-flat surface substantially without any gap therebetween.

* * * * *